United States Patent
Billig et al.

(10) Patent No.: US 9,288,875 B2
(45) Date of Patent: Mar. 15, 2016

(54) METHOD AND APPARATUS FOR MULTIPLE SENSOR LIGHTING CONTROL SYSTEMS FOR DAYLIGHT HARVESTING

(71) Applicant: The Watt Stopper, Inc., Carlsbad, CA (US)

(72) Inventors: Richard R. Billig, Carlsbad, CA (US); Thomas L. Grey, Carlsbad, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 218 days.

(21) Appl. No.: 14/102,362

(22) Filed: Dec. 10, 2013

(65) Prior Publication Data

US 2014/0175985 A1 Jun. 26, 2014

Related U.S. Application Data

(60) Provisional application No. 61/735,433, filed on Dec. 10, 2012.

(51) Int. Cl.
*H01J 1/60* (2006.01)
*H05B 37/02* (2006.01)

(52) U.S. Cl.
CPC ............ *H05B 37/0218* (2013.01); *Y02B 20/46* (2013.01)

(58) Field of Classification Search
CPC ............................ H05B 37/0218; H05B 37/02
USPC ................. 315/130, 149–152, 312, 153, 129; 340/309.9, 815.45, 907; 362/1, 276, 362/802, 458
See application file for complete search history.

(56) References Cited

U.S. PATENT DOCUMENTS

| | | | | |
|---|---|---|---|---|
| 7,425,798 B2* | 9/2008 | St.-Germain | ......... | B61L 5/1881 315/129 |
| 2002/0140379 A1* | 10/2002 | Chevalier | ........... | H05B 33/0803 315/291 |
| 2007/0185675 A1* | 8/2007 | Papamichael | ........... | F21S 13/14 702/85 |
| 2010/0244706 A1* | 9/2010 | Steiner | ...................... | G01J 1/02 315/149 |

* cited by examiner

*Primary Examiner* — Lincoln Donovan
*Assistant Examiner* — Thomas Skibinski
(74) *Attorney, Agent, or Firm* — K. David Crockett, Esq.; Paul J. Backofen, Esq.; Crockett & Crockett, PC

(57) ABSTRACT

A multi-sensor lighting control system includes at least two light sensors. Each sensor gathers light from different sources, by comparing and contrasting the output signals from the two sensors, the controller can automate many lighting control and commissioning processes leading to easier, simpler installations and maintenance and happier customers, and removing the need for special tools. Applying automated closed loop lamp warm-up techniques, the daylight ratio and the maximum electric light contribution can be learned automatically by the system. A multi-sensor lighting control system may also provide intermediate zones of lighting control between adjacent task areas with different lighting requirements.

7 Claims, 2 Drawing Sheets

METHOD AND APPARATUS FOR MULTIPLE SENSOR LIGHTING CONTROL SYSTEMS FOR DAYLIGHT HARVESTING

RELATED APPLICATIONS

This application claims priority to Provisional Patent Application 61/735,433 filed Dec. 10, 2012.

FIELD OF THE INVENTIONS

The inventions described below relate to the field of lighting control systems and specifically lighting control systems for daylight harvesting.

BACKGROUND OF THE INVENTIONS

Systems that control electric lighting in response to available daylight must be calibrated for proper operation. This process generally involves derivation of a "daylight ratio" that predicts the light contributed to the occupant area as a fraction of that seen by a light sensor, and also a measure of the total illumination contributed by the available electric lights. To measure the latter quantity, the electric light sources must be "warmed up" for some period of time, so that they have attained their full intensity prior to measurement. Prior-art approaches generally have used a predetermined time delay (e.g., two minutes), and assumed that the light sources have reached their full intensity by this time. Unfortunately, such an approach is flawed, as the warm-up time to reach full intensity is a function of both the type of lamp (fluorescent, LED, incandescent, HID, etc.) and also can be dramatically affected by the air temperature. Furthermore, impatient installers will sometimes attempt to shorten this time, resulting in inaccurate calibrations.

While light sensing controllers that view only the daylight or natural light sources have been employed for many years, they are typically difficult to commission, requiring both a special tool, a calibrated light meter, and appropriate training.

Because the light output of fixtures declines over time, it is necessary to periodically relamp the fixtures to maintain an acceptable illumination intensity in the task area. The general practice has been to simply replace lamps on a calendar schedule, because it has been difficult to determine when the relamping is truly required. Because different types of lamps degrade at different rates, and the rates may also be affected by environmental conditions, this is a suboptimal strategy. It is also understood by those skilled in the art that the output of most light sources such as fluorescent lamps, LEDs, and others, declines over time, with age. Conversely, when lamps are replaced with new ones, the light output will generally increase. To continue to accurately compensate for daylight changes, over time, it is necessary for the sensor to learn the changes in the available electric light, and update its setting for maximum electric light available in the space, "max EL". This process is sometimes referred to as "recommissioning" and conventionally requires skilled installers.

For accuracy, it is preferable to conduct the recommissioning at night, when the daylight contribution is negligible. When an electric light sensor is present in the design, prior art teaches entering the recommissioning state when the electric light sensor measurement drops below a threshold that would indicate that the sun has set. This threshold is generally a fixed, predetermined value, or perhaps one that can be manually adjusted. Recommissioning the sensor, to determine the present maximum electric light value, requires turning on all controlled loads to their maximum intensity, allowing them to warm-up to maximum light output, and then measuring the resultant illumination intensity. This process will generally take a number of minutes (more than two minutes, in general), and this action may annoy or distract building occupants.

Unfortunately, experience shows that the light threshold required to recommission a system will vary from installation to installation, due to potential stray light that may enter into the light sensor, either through reflectance of electric light from the interior surface of a skylight, or through external light pollution entering through a skylight at night.

SUMMARY

The devices and methods described below provide for a multi-sensor lighting control system with at least two light sensors. Each sensor gathers light from different sources, by comparing and contrasting the output signals from the two sensors, the controller can automate many lighting control and commissioning processes leading to easier, simpler installations and maintenance and happier customers, and removing the need for special tools. Applying automated lamp warm-up techniques, the daylight ratio and the maximum electric light contribution can be learned automatically by the system. A multi-sensor lighting control system may also provide intermediate zones of lighting control between adjacent task areas with different lighting requirements.

The multi-sensor lighting control system is suitable for "top-lit" applications, wherein a space can be illuminated by daylight contributed through one or more skylights, light-tubes or suitable combinations and where multiple light sensors (possibly co-located in a single assembly) can be deployed as part of the control system. At least one sensor, a natural light sensor, is intended to principally monitor the available daylight or external light contributions such as light pollution, and at least one additional sensor, the task area or composite light sensor, is disposed to view the illumination of the task area, sensing the combined effect of the electric lighting and the daylight or other external light contributions available. The quantified illumination intensity, or light intensity measured by the sensors is discussed herein as illuminance. Illuminance is generally understood in the field as is the total luminous flux incident on a surface, per unit area.

The multi-sensor lighting control system may also integrate with other lighting and load controls such as manual control by user input, or automatic control on the basis of occupancy, time scheduling, or other suitable technique. This control system resolves a number of operational issues by improving accuracy and fault-tolerance, and by aiding in user acceptance of such systems by better integrating with other building management systems.

The multi-sensor lighting control system disclosed below provides for a user-configurable time delay after the natural light illuminance drops below the chosen recommissioning threshold, before the recommissioning process will start. This makes it easy to delay recommissioning until the middle of the night, or other preferred time. The lighting control system also provides the ability to delay recommissioning in an area until the area is not in use. This can be determined, in control systems so equipped, by monitoring either user presence directly through occupancy sensors, or inferring such occupancy through user actions such as pressing wall switches. If user presence is detected, the recommissioning can be delayed by a configurable time, or indeed skipped until the next day.

In the multi-sensor lighting control system disclosed below, periodic recommissioning monitors the history of the electric light illuminance in the task area. By selecting and setting an electric light illuminance threshold or "alarm" level, or alternatively, a maximum percentage reduction in illuminance since relamping, the control system can generate a warning to facility management personnel to indicate that relamping is needed. This warning can be displayed either visually in one or more of the sensors, through LED indicators or other local means, or can be communicated over a network (e.g., BACnet) to a central location. Using the multi-sensor lighting control system, relamping may be delayed until actually required by reduced illuminance. This process saves money, while also guaranteeing that adequate illuminance is maintained in task areas over time. Automatic recommissioning may be performed on any cycle desired, daily, weekly, monthly or any other period compatible with the use schedule of the illuminated area.

DETAILED DESCRIPTION OF THE INVENTIONS

Figure 1:
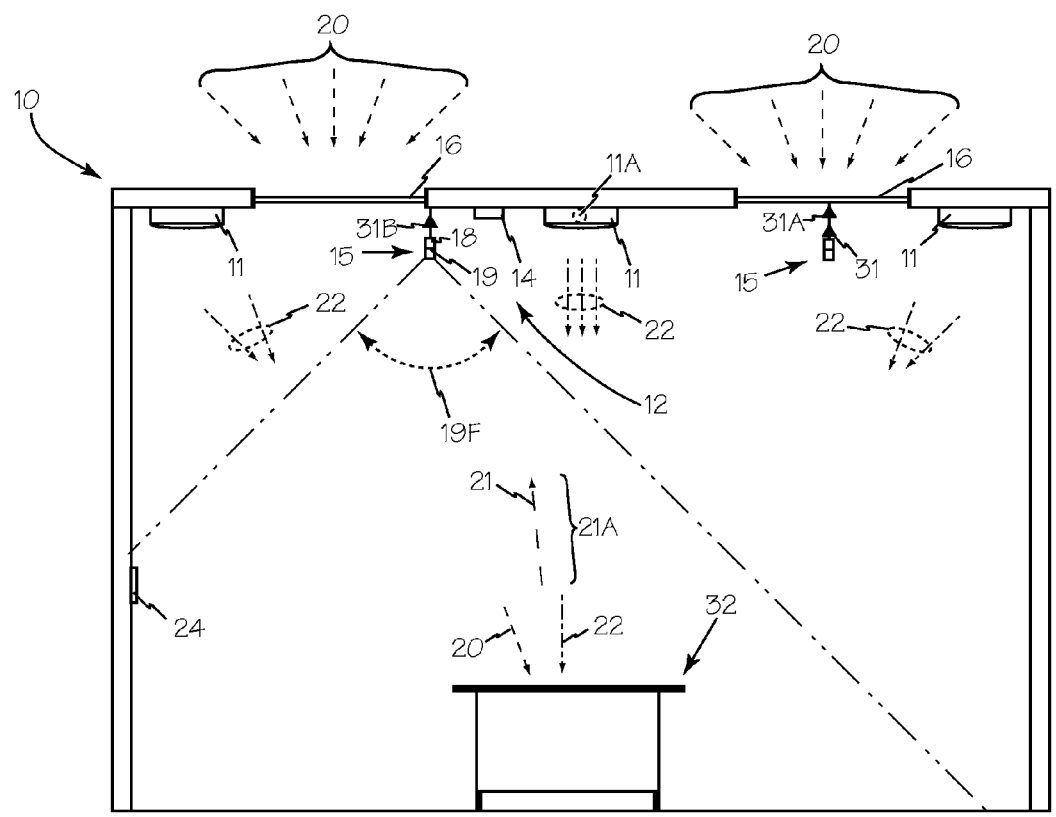
FIG. 1 is a cross-section view of a space with a multi-sensor lighting control system for daylight harvesting.

Task area, space or room 10 of FIG. 1 includes lights or fixtures 11 under the control of illumination control system 12 which includes controller 14 connected to at least one sensor array 15 as part of the control system. Space 10 can be illuminated by daylight contributed through one or more skylights 16, light-tubes or suitable combinations. Each fixture 11 may include one or more lamps 11A. The lamps may be incandescent or fluorescent lights or bulbs or other suitable illumination elements such as LEDs. Each sensor array 15 includes at least two light sensors such as first or natural light sensor 18 and second or composite light sensor 19. First or natural light sensor 18 is oriented to respond primarily to uncontrolled illumination 20 from outside that comes through the skylights 16 such as sunlight and ambient light from surrounding areas. Second or composite light sensor 19 is oriented to respond to the combined or composite illumination 21 which is the combination of natural outside illumination 20 and controlled illumination 22 in task area 10. The combination of natural light sensor 18 and composite light sensor 19 enables a fully automated lamp warm-up process, regardless of lamp type or temperature. The multi-sensor lighting control system 12 may also integrate with other lighting and load controls such as manual control 24 for user input, or automatic control on the basis of occupancy, time scheduling, or other suitable technique.

Multi-sensor lighting control system 12 automatically controls lighting in one or more task areas such as area 10. To optimize efficient control of the lighting loads, system 12 collects illumination data 31 on illuminance in the task areas to be monitored. Illumination data 31 may include data such as the timing and the illuminance contributions of electric and natural sources, data 31B and data 31A respectively, as well as lamp warm up time, starting intensity and final intensity and other suitable parameters. Prior to the warm-up of any of the lamps, a daylight ratio (DR) is computed by making multiple measurements of both the natural light sensors 18 and composite light sensors 19 with the controlled loads such as electric lights 11 extinguished. The daylight ratio is then computed as:

DR=COMPOSITE SENSOR ILLUMINANCE/
NATURAL LIGHT SENSOR ILLUMINANCE

Composite light sensor 19 is disposed to measure composite illuminance level 21A in the task area. Composite illuminance 21A is a combination of daylight 20 and electric light 22 and the present intensity of the electric light (EL) in task area 10 is proportional to the composite light sensor's output, with any daylight contribution removed. This means that:

EL~COMPOSITE ILLUMINANCE−
(DR*NATURAL LIGHT ILLUMINANCE)

To warm up the loads, the present invention uses the following steps:
1. Adjust the controller to fully illuminate all loads at their maximum level (100%).
2. Initialize variables:
   a. warmupLoopCounter=0
   b. belowMaxSamples=0
   c. maximumEL=0
3. Take simultaneous readings from the natural light sensor and composite light sensor, then compute the EL, as defined above.
4. If EL>maximumEL:
   a. belowMaxSamples=0
   b. maximumEL=EL
   else:
   belowMaxSamples=belowMaxSamples+1
5. warmupLoopCounter=warmupLoopCounter+1
6. If (warmupLoopCounter>MINIMUM_WARMUP_TIME) and (belowMaxSamples>=MINIMUM_MAX_SAMPLES), warmup is complete, and maximumEL contains data 31B representing the full electric light output as measured by composite light sensor 19, else go back to Step #3 and continue iterating.

For situations in which the maximum electric light output or illuminance, is suitable for use of the controlled or task area 10, a natural light dimming or switching setpoint, setpoint 29 can be derived based on measurements from both sensors, as follows:

SETPOINT 29=SETPOINT_FACTOR*(MAXIMUM EL/DR)

where the "setpoint factor" allows setpoint 29 to be established at an illumination intensity level somewhat above the illumination intensity level contributed by the electric lighting alone. When the natural light illuminance measured by natural light sensors 18 exceeds setpoint 29, electric loads may be dimmed or switched off. Conversely, when the natural light illuminance measured by sensors 18 is less than setpoint 29, additional electric light can be added, if possible, by increasing the dimming level, or by switching on one or more additional loads.

Similarly, when control is to be based upon the interior light levels, measured by the composite light sensor 19, an ambient setpoint, setpoint 30 can be derived as follows:

composite LIGHT SETPOINT
30=SETPOINT_FACTOR*MAXIMUM EL

Once this calibration is established, the control of the lighting can be performed entirely using the composite light sensor, if that is the preferred control scheme for a particular customer or application.

Since the output of most electric light sources, loads, declines over time, it is necessary to account for this to maintain an accurate task lighting intensity or illuminance. Prior art systems using a natural light sensor will use the sensor output to determine when it is dark outside (a darkness threshold) and time to initiate a check and possible reset of the current maximum electric light output (sometimes referred to as recommissioning in the art). Unfortunately, different installations vary in the amount of light pollution that may affect the determination of the darkness threshold, thereby requiring a manual intervention that is counter to the goal of fully automated task area lighting control.

Multi-sensor lighting control system 12 maintains a history of the maximum and minimum illuminance data measured by natural light sensor 18, together with time data indicating when these measurements occurred. As the minimum should be a diurnal event, this historical data can be filtered to derive an illumination intensity threshold that can be reliably achieved in the controlled task area. Because the light source output declines relatively slowly over time it is not strictly required to perform recommissioning every night. A delay in deriving this threshold has little or no impact on system operation.

The periodic recommissioning can be adjusted to take advantage of space usage conditions, e.g., adding an adjustable time delay after the threshold is reached to perform the lamp adjustments when usage is low such as late Sunday night, or coupling with occupancy sensors to perform the periodic recommissioning when the space is unoccupied, or when the data indicate outside light contributions are lower (e.g., new moon). Thus, the mechanism for determining when recommissioning needs to occur is automated and responsive to conditions that affect its accuracy.

In some daylight-harvesting applications, it is preferred to control light levels not by dimming all fixtures, but instead by switching on and off subsets of the controlled lighting. This is often called "step-dimming". For example, an area can be lit with three-lamp fixtures, one lamp of each fixture connected to load circuit A, and the other two lamps connected to load circuit B. When both A & B are energized, 100% of the electric light output is available. If only B is energized, 67% of the electric light output is achieved. Further, if only A is energized, 33% of the electric light output is produced. When both A & B are off, only daylight is present.

To increase the light output in steps, the controller wishes to transit between the states, as follows:

(A OFF, B OFF)->
  (A ON, B OFF)->
    (A OFF, B ON)->
      (A ON, B ON)

When making the intermediate transition (A on, B off) to (A off, B on), however, a problem can arise—if circuit A is turned off and B turned on at the same time, the light output may drop precipitously for a time, because the lamps on the B circuit may take some time to strike and to warm-up to their full intensity. Hence, a staggered-switching scheme is often applied to these transitions, inserting an intermediate state with both loads on temporarily, as in:

(A ON, B OFF)->(A ON, B ON)->(A OFF, B ON)

While this staggered-switching approach guarantees that the task area remains lit at all times, the duration of the intermediate state should be kept as short as possible to minimize occupant complaints. Prior-art designs use a predetermined, fixed time in the intermediate state.

The present invention addresses this issue by using the combination of its two sensors to measure the electric light contribution, and switching off circuit A as quickly as possible when load B has adequately warmed up.

Note that the staggered-switching requirement also exists when reducing the illuminance, as in:

(A OFF, B ON)->(A ON, B ON)->(A ON, B OFF)

The transition from the intermediate state to the final state occurs only after the electric light output of circuit A has been detected as adequate; only then is circuit B turned off.

Dual-Loop Control with Adaptation to User Overrides

In a multi-sensor lighting control system, illuminance data 31 from both the natural light and composite light sensors, 18 and 19 respectively, is referenced in active control of the electric lights, with the composite light sensor being used as the primary reference, to accurately maintain illuminance levels in the task area. Transients introduced by changing reflectances in the task area such as the temporary introduction of a highly-reflective or highly absorptive object 32 in field of view 19F of composite light sensor 19 can be effectively handled by temporarily switching the control source from the composite light sensor to the natural light sensor.

In more complex lighting control systems such as retail space 40, it is common practice to permit user modification of the light intensity levels of a subset of fixtures or lamps, either turning them off, or overriding their levels above or below that set by the automatic control system. Such actions can cause incorrect behavior in a natural light control system, as the controlled electric light contribution can no longer be forecast accurately.

Consequently, multi-sensor control system 41 detects such user overrides accomplished using manual controls 42, and switches control to natural light sensor 43A for the duration of such override, for seamless operation in parts of the task area that have not been overridden.

While the foregoing discussion principally focused on a lighting control system including a single composite light sensor 43B and a single natural light sensor 43A which may be combined in a single sensor array 43, there are many reasons why multiple redundant sensor arrays or redundant individual sensors could be helpful in a daylight-harvesting application, for increased reliability and for improved accuracy of control.

For example, redundant natural light sensors can be deployed, in separate skylights above the same task area. Because each skylight may be subject to different shade conditions (from external objects like trees, adjacent structures, and so on) and these conditions will change over the period of a day, or from month-to-month as the apparent path of the sun through the sky changes, a control system that can combine the data from the multiple sensors (generally, by choosing the highest reading seen from all sensors installed) will yield the most accurate and appropriate control.

Furthermore, support for replicated or redundant sensors permits higher reliability of operation, as any one sensor can fail or become accidentally disconnected without terminating control operation. Likewise, aggregating data from multiple composite light sensors can also assist in detecting a sensor temporarily "blocked" or overdriven by the placement of transient objects changing the apparent illuminance. In addition to accounting for shadows or other obstructions falling on selected skylights in a multi-skylight installation, there is also an application in large retail stores that have separate merchandising areas, such as clothing, food and TV's.

A multi-sensor lighting control system 41 includes redundant sensor arrays 43, with each sensor array corresponding to one or more different skylights. Controller 44 is configured to provide different lighting control algorithms 45, with each algorithm corresponding to different areas of the store. Clothing area 46 may need to have a higher illuminance to promote sales while electronics area 47 may need to have a lower illuminance to promote television sales. The redundant sensor arrays 43 could be set and operate discretely, or their data 31 may be aggregated by system 41 allowing data and control to be shared to maintain an overall, store-wide lighting ambience or to respond to certain system wide commands, such as a command to turn all lighting to maximum intensity during an emergency, or other suitable manual commands from an operator interface such as control panel 42.

In large facilities such as warehouses or warehouse stores with multiple daylight sensors, or one daylight sensor configured to control multiple lighting zones to different dimming levels, there will invariably be discontinuities between lighting fixture light intensity zones that may be visible to a customer in the store. If, for example, the lights 48 in electronics area 47 are set to provide 50% illuminance next to clothing area 46 set to provide 80% illuminance will create an abrupt boundary 49 where it is obvious that row 50 of lights is brighter than row 51 next to it. While a brightly-lit boundary around the perimeter of the retail space is often desirable and is achieved in some installations by lighting the walls of the perimeter at a higher level, boundaries within the retail area can prove disorienting to customers and negatively impact their impressions of the store.

Control system 41 is configured to provide at least one row of intervening lights between adjacent task areas where the illuminance or dimming level can be set to an intermediate point between the illuminance of the adjacent task areas to blend the discontinuity between differences in illuminance between the adjacent zones such as clothing area 46 and electronics area 47.

Lighting control algorithm 45x defines the lighting fixtures on the border of a particular predetermined zone as a blend zone. Each task area or zone would contribute one or more lights 48 in a row or column to the blend zone, zone 52. Effectively, blend zone 52 consists of two rows of fixtures, rows 50 and 51. In this example, row 51, which is part of electronics area 47 set to 50% illuminance, would be set to 60% illuminance, while the border fixtures of the 80% zone, row 50 of clothing area 46 would be set to 70% illuminance, thereby creating a blend zone 52 that masks the transition between clothing area 46 and electronics area 47.

Alternatively, primary dimming zones are established with single set of blend zone fixtures or lights 48 defined between those zones. Blend zone fixtures 53 would be set to 65% to transition between first task area 55 which is set to provide 80% illuminance and second task area 57 which is set to provide 50% illuminance. Daylight sensor 58 may set primary dimming zone and blend zone dimming levels directly and communicate those to fixtures 48, or it could communicate those to controller 44 that then sends dimming commands 59 to the fixtures, depending on whether or not the daylight sensor is a stand-alone controller or part of a control system.

It is noted that lighting fixtures 48 may actually have multiple, separately controllable lamps, such as a three or six lamp fluorescent lighting fixture. In that case, the blend zone may be established within the boundary fixture, e.g., setting the inner most lamps to the dimming zone and setting the outer most lamps to the blend zone. In the example above using a three lamp fixture, the inner most lamp would be at 80%, the middle lamp would be at 70% and the outer most lamp at 60%, and the adjacent zone could be entirely at 50%. Alternatively, the 50% zone could contribute the outer lamp to the blend zone set at 60% and the 80% zone contribute its outer most lamp to the blend zone set at 70%. It is noted that fixtures placed side to side have this ability, but fixtures placed end to end typically do not (e.g., typical fluorescent fixtures). In the end to end situation, all the lamps in the entire fixture would typically contribute equally to the blend zone dimming level. Clearly, multiple alternative settings and possibilities are possible depending on the type of fixtures used and the level of individual lamp control available.

While illuminance is the primary issue in most stores, new LED lighting also has the capability to adjust color. The blend zone concept would apply to intensity and color, depending on the light fixture capability. Controller 44 or sensor array 43 may be able to sense the light fixture capability through messaging with the fixtures, perhaps directly or through an intervening control or central control, or capability could be configured as part of the commissioning process wherein light fixture loads are logically bound to the sensor for control purposes. Also, LED lighting fixtures are typically composed of multiple lamps that would allow a high degree of granularity of control in the blending zone in both the side to side and end to end situations (unlike fluorescent lamps where there is a clear difference in blend zone options).

The concept may also be extended to control of skylight light intensity via shades, louvers or electronic opacity screens (e.g., standard skylights or reflector-tube-type skylights), or to distributed skylight systems such as those based on fiber optic transmission of daylight to particular fixtures.

Figure 2:
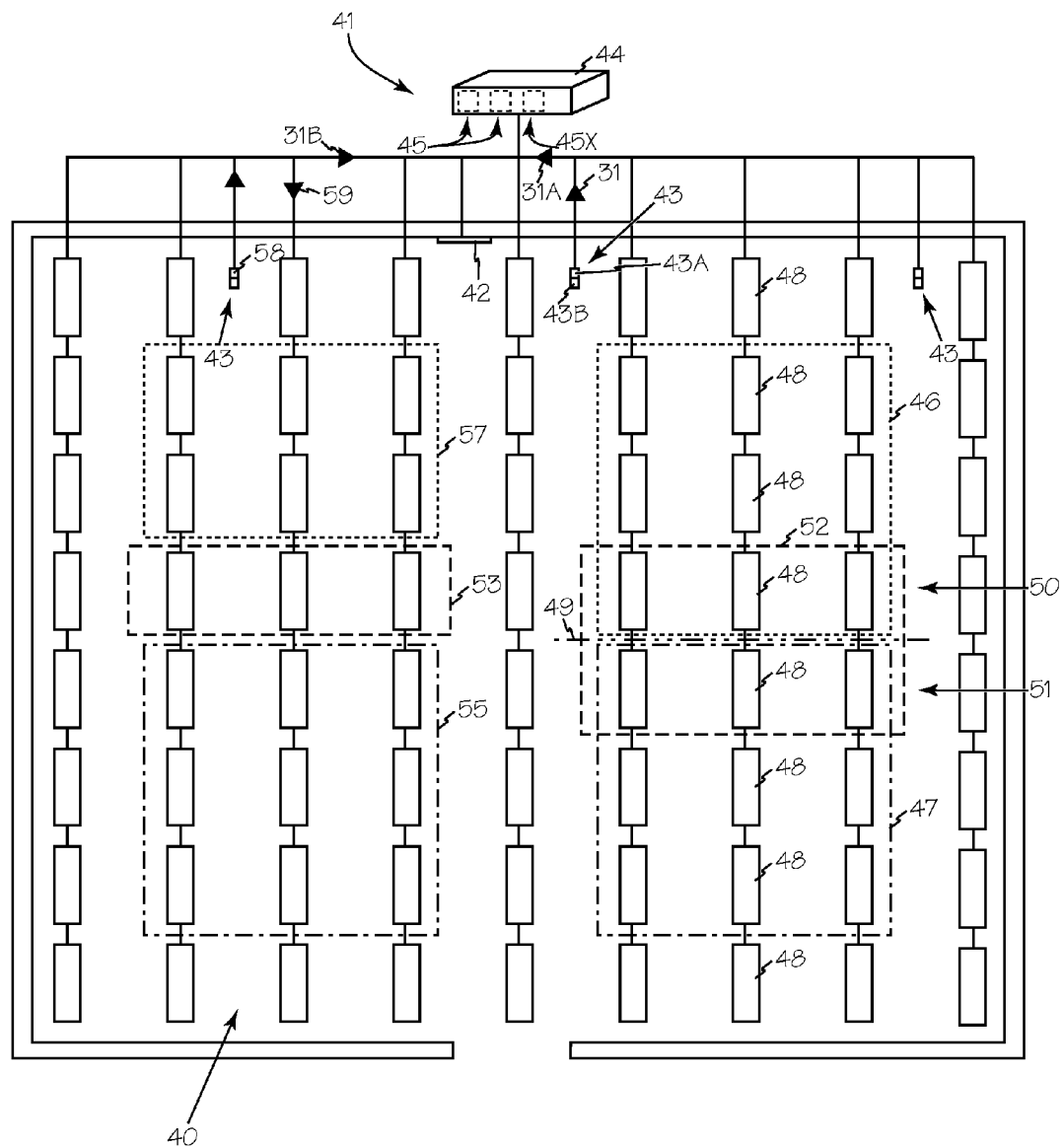
FIG. 2 is a lighting plan diagram for a large retail space.

Multi-sensor lighting control systems such as system 12 of FIG. 1 and system 41 of FIG. 2 may be designed to modulate both daylight and natural light, according to one or more selectable algorithms. Such a system could be generally defined to permit choice of an optimal control strategy from a variety of such strategies, including:

minimum electric power usage compatible with maintaining adequate light levels at the task, maintenance of best light level at task compatible with a target power (demand-side management), minimum total energy usage, integrating lighting and HVAC—this might mean admitting less daylight in the summer and more in the winter to balance heat load optimal selection of daylight and electric light to maintain a desired temperature optimal mixing of natural and artificial light to yield good color rendition, when electric light sources have poor CRI (color rendering index) and can be supplemented with some natural light etc.

This should broadly include all strategies that can affect the daylight delivered, including louvers, steerable solar collectors (where available), films or coatings that may be modulated under a control to change their transmissivity and/or color, etc. This approach would allow different management strategies to be applied to different subsets of the space being controlled.

Multi-sensor lighting control systems such as system 12 of FIG. 1 and system 41 of FIG. 2 may also be responsive to demand response commands from the external electrical grid and would lower electric light levels temporarily and increase natural light levels if under control (e.g., louvered skylights or controllable daylight fiber optic distribution system). Lowering of electric light levels can be by switching out lamps (stepped or staggered dimming) or by dimming single or multiple zones, including the blend zones as discussed above. The control system may need to transition to only natural light sensor control, or may need to temporarily disable both natural light sensor and composite light sensor control, during the demand response period so as to maintain minimum energy usage levels. The system can enter demand response automatically if it is configured to receive demand response commands, e.g., via a building automation system interface, or can enter manually by a user who is responding to the command, e.g., sent via email to a building manager who uses a suitable user interface, such as a computer interface, a wireless handheld interface like an infrared or radio based handheld commissioning tool or tablet/smartphone application, a few buttons on a daylight sensor, preconfigured user override (like a programmed wall switch button labeled "demand response" and programmed to set the system as commissioned). Commissioning tools would need to allow setting of demand response functions, such as demand response target light level, which zones participate (a user may not want all zones to participate in order to maintain certain light levels in certain parts of a building, allowing other zones to shoulder the response). When the demand response event is lifted, the system goes back to normal control, but this transition to normal control may need to occur in a certain sequence of steps in order for the daylighting control(s) to regain functional control of the lighting, e.g., determine current state of light electric and natural levels, determine optimized target state, initiate natural light sensor control and remeasure, redetermine target state levels as needed, then initiate composite light sensor control and remeasure, adjust light levels as needed to achieve the target illuminance.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A multiple sensor lighting control system comprising:
    an illumination control system including a controller for controlling one or more illumination sources in an area;
    at least one sensor array, each sensor array including a natural light sensor responding to uncontrolled illumination entering the area and a composite light sensor responding to both uncontrolled illumination and controlled illumination within the area;
    wherein the controller is operably connected to the at least one sensor array to determine the controlled luminance in the area and then determine a composite light setpoint to permit control of the one or more illumination sources with only the composite light sensor.

2. The lighting control system of claim 1 wherein the control system maintains a history of maximum and minimum illuminance measurements from the natural light sensor to derive an illuminance intensity threshold for the area.

3. The lighting control system of claim 2 wherein the control system generates a warning that relamping is needed in the area based on a measured reduction in illuminance since relamping.

4. A multiple sensor lighting control system for an area with two or more lighting zones, the system comprising:
    an illumination control system including a controller for controlling one or more illumination sources in each of the two or more lighting zones;
    at least one sensor array in each of the two or more lighting zones, each sensor array including a natural light sensor responding to uncontrolled illumination entering the lighting zone and a composite light sensor responding to both uncontrolled illumination and controlled illumination within the lighting zone;
    a plurality of lighting algorithms, with at least one lighting algorithm corresponding to each of the two or more lighting zones;
    wherein the controller is operably connected to the at least one sensor array in each of the at least two or more lighting zones to determine the controlled luminance in each lighting zone corresponding to each sensor array, and then determine a composite light setpoint to permit control of the one or more illumination sources with only the composite light sensor.

5. The lighting control system of claim 4 wherein the control system maintains a history of maximum and minimum illuminance measurements from the natural light sensor to derive an illuminance intensity threshold for the area.

6. The lighting control system of claim 5 wherein the control system generates a warning that relamping is needed in the area based on a measured reduction in illuminance since relamping.

7. The lighting control system of claim 4 wherein the controller controls one or more illumination sources in border areas corresponding to a border between adjacent lighting zones and the one or more illumination sources in border areas are controlled to provide intermediate illuminance between the illuminance of each of the adjacent lighting zones.

* * * * *